United States Patent [19]

Bukač et al.

[11] 4,105,644
[45] Aug. 8, 1978

[54] ANIONIC POLYMERIZATION OF CAPROLACTAM AT A TEMPERATURE BELOW THE MELTING POINT OF POLYCAPROLACTAM

[75] Inventors: Zbyněk Bukač; Jan Šebenda, both of Prague; Miloslav Loyda, Neratovice, all of Czechoslovakia

[73] Assignee: Ceskoslovenska akademie ved, Prague, Czechoslovakia

[21] Appl. No.: 701,906

[22] Filed: Jul. 1, 1976

[30] Foreign Application Priority Data

Jul. 8, 1975 [CS] Czechoslovakia .................. 4847/75

[51] Int. Cl.² .............................................. C08G 69/18
[52] U.S. Cl. .................................. 528/314; 528/315; 528/323; 528/317; 528/319
[58] Field of Search .............................. 260/78 L, 78 P

[56] References Cited

U.S. PATENT DOCUMENTS

| 3,488,326 | 1/1970 | Van Beveren et al. | 260/78 L |
| 3,804,813 | 4/1974 | Takamiya et al. | 260/78 L |

*Primary Examiner*—Harold D. Anderson

[57] ABSTRACT

The invention relates to a method for manufacturing of anionic polycaprolactam with a low content of water extractables and high stability of the degree of polymerization during melting by a two-stage polymerization using known basic initiators and known activators of the following types:

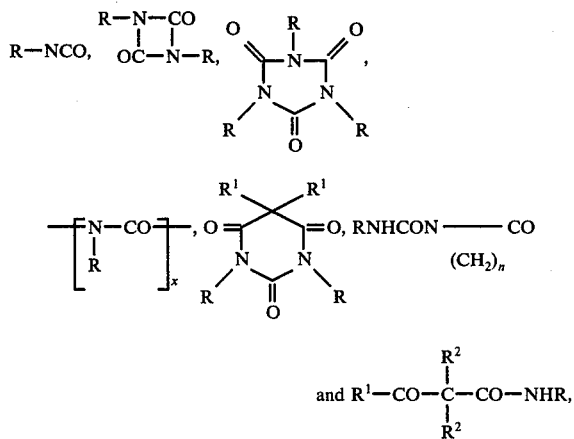

where R is

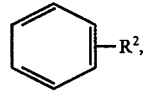

$R^1 = R$ or $C_{1-4}$ alkyl, cycloalkyl or allyl, $R^2 = C_{1-4}$ alkyl or H atom, $n$ is an integer 3-11 and $x$ is an integer $>3$. The ratio of activator to initiator (e.g. sodium dihydromethoxyethoxyaluminate) ranges between 2.6 and 4.2, advantageously 2.8 - 3.5. The first polymerization stage proceeds at 150°–200° C for $\leq 10$ min, the polymer is then shaped and postpolymerized at 150°–200° C for $\leq 90$ min to achieve a monomer content near to the equilibrium content corresponding to the 2nd stage temperature.

2 Claims, No Drawings

ANIONIC POLYMERIZATION OF CAPROLACTAM AT A TEMPERATURE BELOW THE MELTING POINT OF POLYCAPROLACTAM

BACKGROUND OF THE INVENTION

The invention relates to manufacturing of anionic polycaprolactam with a low content of monomer and stable degree of polymerization of the molten polymer.

Any polymerization product of caprolactam contains, after completed polymerization, the equilibrium amounts of polymer and monomer. This composition depends on the polymerization temperature and amounts, e.g. at 250° C, to about 89% of polymer and 11% of water-extractable materials (further called extractables) which consist of monomer and oligomers. The equilibrium is shifted to the polymer with decreasing polymerization temperature. Thus, the polymer fraction increases to 95% at 200° C. High content of extractables in the polymerization product unfavourably affects the properties of the final article from polycaprolactam. The polymerization product required by customers has a minimum content of extractables below 3%. The polymerization temperature corresponding to such equilibrium content of polymer and monomer in the product is about 170° C. If the common concentrations of catalyst components, e.g. N-acylcaprolactam and sodium caprolactamate, are used, the polymerization mixture should be heated for a rather long period (more than 30 minutes) during which the polymer solidifies and cannot be conveyed in a simple way. This is unsuitable for the continuous manufacturing. Shorter polymerization periods may be achieved with increased concentration of catalyst components; however, this results in a lower stability of the degree of polymerization. Both requirements, i.e. low extractables and stability of the degree of polymerization, can be met in the adiabatic anionic polymerization of caprolactam. However, this discontinuous method is economically inconvenient in comparison to the continuous production and, in addition to this, large castings need to be expensively disintegrated in costly equipment.

This is why new routes have been sought for preparation of the polymer with reduced content of extractables. For example, the polymerization is carried out according to the Czechoslovak Pat. No. 127,660 and its corresponding British Pat. No. 944,307 checked at the temperature above the melting temperature of the polymer, e.g. at 250° C and higher, and the equilibrium amount of the monomer is removed in vacuum. Expensive and complicated equipment is the main disadvantage of that procedure. The recovered caprolactam contains also undesirable cyclic oligomers and volatile products of side reactions and cannot be used again in the polymerization without purification. Other procedures, e.g. according to the Czechoslovak Pat. No. 113,971 checked corresponding to U.S. application No. 365,507, now abandoned and similarly according to the British Pat. No. 944,307, allow the reduction of the monomer content substantially if the polymerization is carried out at a temperature above or around the melting temperature of the polymer and the product is post-polymerized to equilibrium at a lower temperature.

High polymerization temperatures above the melting temperature of the polymer have some shortcomings. Side reactions which take place in any anionic polymerization are undesirable for the polymerization course as well as for the final product. Their extent is affected by the kind of catalyst components, their concentration and ratio, and also by the polymerization temperature. The activity time of the catalyst and its ability for post-polymerization are decreased at higher temperatures and the molecular weight is affected at the same time.

DETAILED DESCRIPTION OF THE INVENTION

Disadvantages of the recent procedures may be overcome according to this invention by subjecting the polymerization mixture to partial polymerization below the melting temperature of the polymer, then the product is shaped and further polymerized below the melting temperature of the polymerization product. Polycaprolactam resulting under these conditions has a monomer content close to the equilibrium content corresponding to the temperature of the second polymerization stage. Unlike the recent procedures, both polymerization stages are carried out below the melting temperature of the polymer, in the presence of such catalyst components and at such ratios and concentrations thereof that the activity life of the catalyst system is just sufficient for achieving the polymerization equilibrium. The catalysis of the depolymerization reaction is reduced to a minimum in this way, while virtual equilibrium conversion to polymer is attained. The catalyst components are, according to this invention, the commonly employed bases, as e.g. alkali metal salts of lactams, alkali metal alkoxides, or complex hydrides of metals, namely Synhydrid ® (sodium dihydroalkoxyethoxyaluminate), and known activators of the general composition

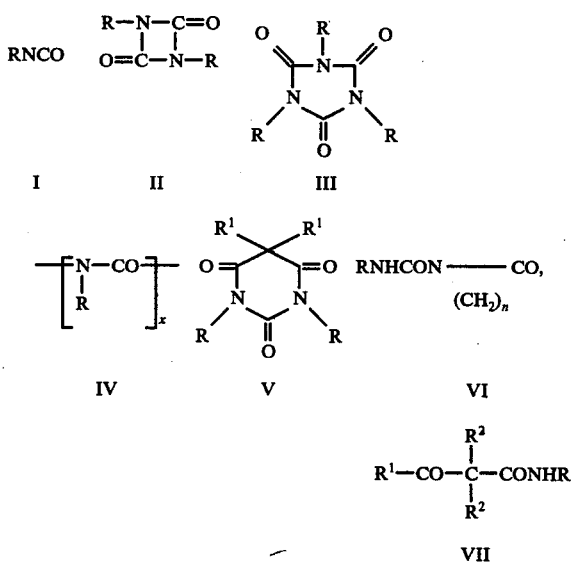

where
R is the aromatic residue of formula

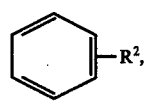

$R^1$ is R or alkyl containing 1 to 4 carbon atoms, cyclohexyl or allyl, $R^2$ is alkyl with 1 to 4 carbon atoms or H atom, $n$ is an integer from 3 to 11, and $x$ is an integer larger than 3.

The concentration ratio of the activators to the base employed ranges between 2.6 and 4.2.

The method for manufacturing of anionic polycaprolactam with a low monomer content and a stable viscosity according to this invention exhibits a number of advantages in comparison to the recent procedures. Both polymerization stages, i.e. prepolymerization and postpolymerization, can be carried out according to this invention at temperatures below the melting temperature of polycaprolactam, which fact is economically advantageous because the expenses for energy and production equipment are reduced. Another advantage of this procedure consists in the suppressed extent of undesirable side reactions at the lower temperature, and, consequently, in the shortened period of the second polymerization stage, i.e. postpolymerization, which fact is very important for the whole technology. A further great advantage of the process according to this invention is the possibility of producing polycaprolactam which has not only a reduced content of monomer but may have a highly stable degree of polymerization. Polycaprolactam with a low monomer content and stable melt viscosity is required both for injection molding and extrusion. The aforesaid advantages of the process according to the invention represent the technical progress with regard to the present state.

EXAMPLE 1

A polymerization mixture was prepared by the successive dissolution of 0.15 mol. % of sodium caprolactamate and 0.515 mol. % of 1,3,5-triphenyl-s-triazine-2,4,6-trione at about 100° C. The polymerization product containing 60 – 70% of polycaprolactam resulted by heating to 170° C for 3 – 4 minutes. The product was shaped into cylindrical chips and then further heated for 30 min to 170° C the product containing 97.1% of polycaprolactam. Intrinsic viscosity (0.5% solution in cresol, 25° C) of the polymer was 1.8 and it was nearly identical with that of the polymer prepared by the polymerization of the same initial mixture for 30 min at 250° C.

EXAMPLE 2

The polymerization mixture was prepared similarly as in Example 1 by the successive dissolution of 0.2 mol. % of Synhydrid ® (sodium dihydromethoxyethoxyaluminate) and 0.515 mol. % of an activator mixture consisting of equal parts of N-phenyl-carbamoylcaprolactam, 1,3-diphenyluretidinone and 1,3,5-triphenyl-s-triazine-2,4,6-trione, and heated to 190° C for 2 minutes. The polymerization product in the form of a solid rod was then heated for 30 min to 165° – 170° C to give a product containing about 3% of water-extractables. The polymer exhibited a stable viscosity similarly as in Example 1.

EXAMPLE 3

The following components were dissolved in molten caprolactam at 80° – 90° C: 0.2 mol. % of sodium hydride and a mixture of 0.6 mol. % of 1,3,5-triphenyl-s-triazine-2,4,6-trione and 1 mol. % of 1,3-diphenyl-5,5-dimethylbarbituric acid. The polymerization mixture was heated for 2 minutes to 180° C. The crystalline polymerization product, in the form of a rod which was formed after cooling, was then further heated for 60 minutes to 155° – 160° C. The polymer obtained in this way contained only about 2% of water extractables and exhibited a stable viscosity on heating to 230° C in the molten state.

EXAMPLE 4

The polymerization mixture was prepared by the successive dissolution of 0.15 mol. % of sodium hydride and 0.52 mol. % of 1,3,5-triphenyl-s-triazine-2,4,6-trione in caprolactam and heated for 5 minutes to 160° C. The polymeric block, which was formed after cooling, was further heated for 30 to 60 minutes at 175° C giving polycaprolactam with 3% of water extractables and stable viscosity.

We claim:

1. A method for manufacturing moldable and extrudable anionic polycaprolactam having a low content of water extractable compounds and a highly stable molecular weight using known basic initiators and known activators of the general formulae I-VII,

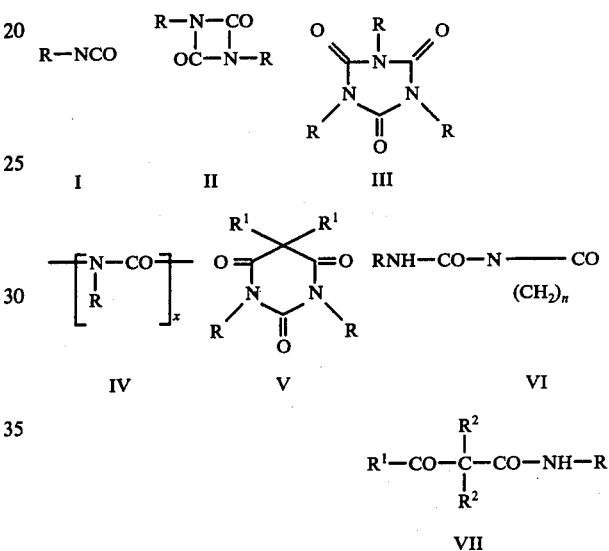

where
R is the aromatic residue

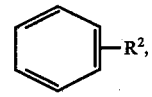

$R^1$ is R or alkyl with 1 to 4 carbon atoms, cycloalkyl or allyl,
$R^2$ is alkyl with 1 to 4 carbon atoms, or H atom,
$n$ is an integer from 3 to 11,
$x$ is an integer larger than 3, which comprises, in a first stage, subjecting a polymerization mixture of caprolactam, activator and strong base catalyst, wherein the ratio of said activator to said catalyst is 2.6 to 4.2, to a temperature of 150°-200° C. for at most 10 minutes, shaping the resulting polycaprolactam and thereafter, in a second stage, subjecting said shaped polycaprolactam to a further temperature of 150°-200° C for at most 90 minutes to produce a polycaprolactam having a monomer content very close to the equilibrium amount corresponding to the temperature of this second stage of polymerization.

2. The method as set forth in claim 1, wherein the activator - to - initiator ratio is 2.8 – 3.5.

* * * * *